United States Patent [19]
Lee

[11] Patent Number: 5,867,997
[45] Date of Patent: Feb. 9, 1999

[54] HEATING CONTROL APPARATUS OF AIR CONDITIONER AND METHOD THEREOF

[75] Inventor: Gab-Youl Lee, Suwon, Rep. of Korea

[73] Assignee: Samsung Electronics Co., Ltd., Suwon, Rep. of Korea

[21] Appl. No.: 989,164

[22] Filed: Dec. 11, 1997

[30]     Foreign Application Priority Data

Jun. 27, 1997 [KR]  Rep. of Korea .................... P97-28363

[51] Int. Cl.⁶ ..................................................... F25B 13/00
[52] U.S. Cl. ................... 62/180; 62/186; 62/160
[58] Field of Search ............................ 62/180, 182, 186, 62/157, 158, 231, 160, 126, 129, 127; 236/46 F

[56]             References Cited

U.S. PATENT DOCUMENTS

| | | | |
|---|---|---|---|
| 4,075,864 | 2/1978 | Schrader .................................... | 62/180 |
| 4,232,530 | 11/1980 | Mueller .................................. | 62/126 X |
| 4,246,763 | 1/1981 | Mueller et al. ........................ | 62/126 X |
| 4,860,552 | 8/1989 | Beckey .................................. | 62/180 X |

*Primary Examiner*—Harry B. Tanner
*Attorney, Agent, or Firm*—Burns, Doane, Swecker & Mathis, L.L.P.

[57]             ABSTRACT

A heating control apparatus of an air conditioner and method thereof are provided to control an indoor fan according to temperature of an indoor heat-exchanger at an initial heating stage of the heating operation, thereby preventing cool air from being discharged indoors, the air conditioner having an indoor heat-exchanger to heat-exchange the room air circulated by an indoor fan and a compressor to circulate a coolant for being heat-exchanged at the heat-exchanger, the apparatus comprising: a temperature detecting unit to detect the changing temperature of the indoor heat-exchanger with the compressor being maintained at the operation state during the heating operation; a controlling unit to control the operation of the indoor fan by counting the time according to the temperature of the indoor heat-exchanger detected by the temperature detecting unit; and an indoor fan motor driving unit to turn the indoor fan off according to the control of the controlling means in order to prevent cool air from being discharged when the temperature of the indoor heat-exchanger detected by the temperature detecting unit is under the predetermined temperature for the predetermined time duration.

3 Claims, 6 Drawing Sheets

HEATING CONTROL APPARATUS OF AIR CONDITIONER AND METHOD THEREOF

BACKGROUND OF THE INVENTION

1. Field of the Invention

The present invention relates to an air conditioner with a dual function of cooling and heating operations, and more particularly to a heating control apparatus of an air conditioner and method thereof to control an indoor fan according to temperature of a heat-exchanger at an initial heating stage to prohibit cool air from being discharged indoors.

2. Description of the Prior Art

Generally, an air conditioner includes a heating apparatus for supplying warm air by heating cold room air and a cooling apparatus for supplying cool air by cooling warm room air. Besides, a heating and cooling apparatus is also included for a dual function of heating and cooling operations and an air purifying which cleans polluted room air.

Figure 1:
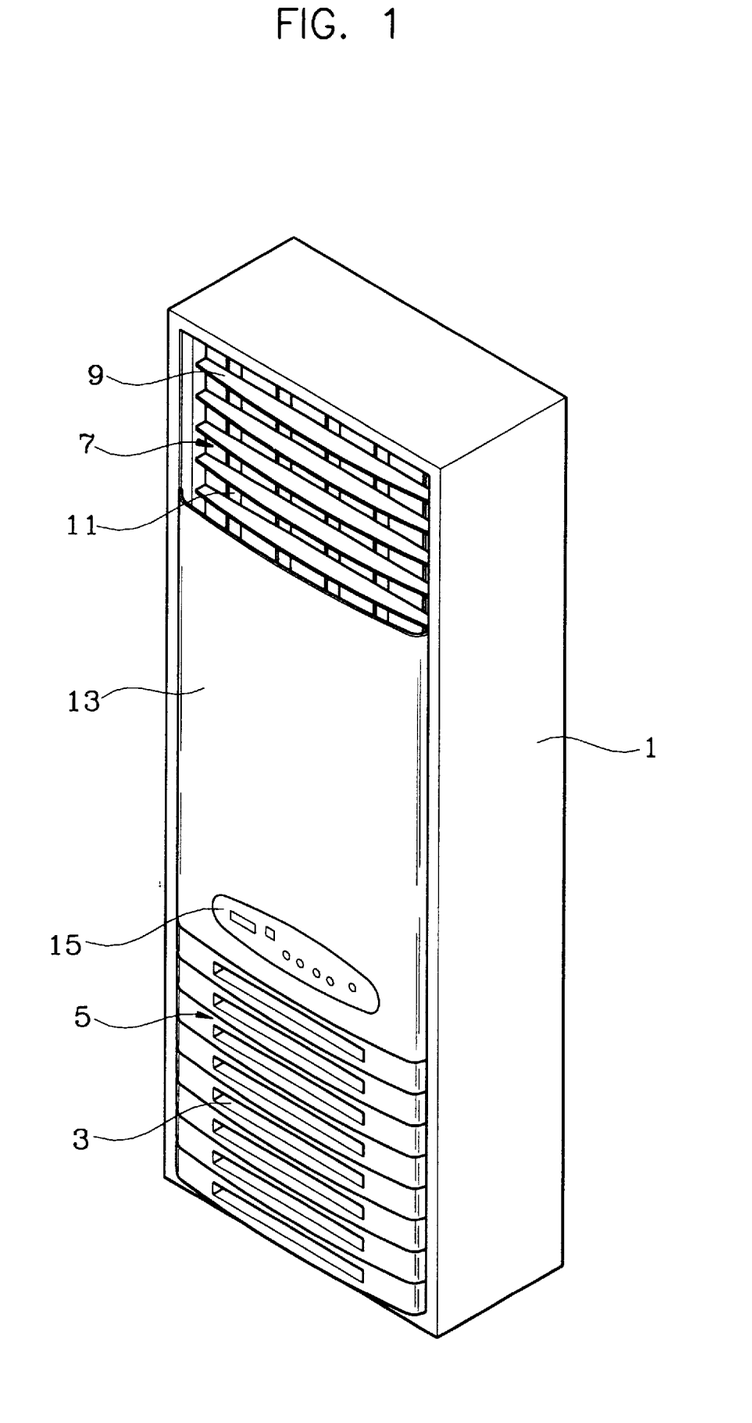
FIG. 1 is a perspective view for illustrating an indoor unit of a conventional air conditioner.
Figure 2:
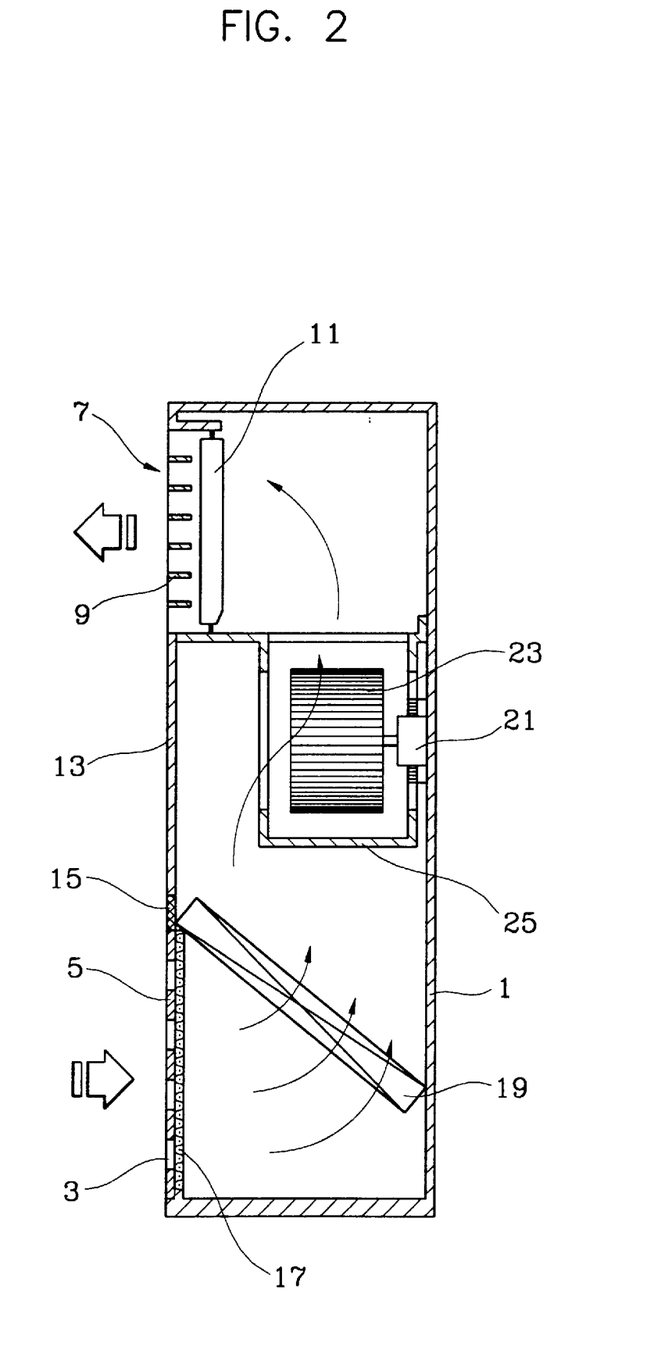
FIG. 2 is a longitudinal sectional view of FIG. 1.

FIGS. 1 and 2 illustrate an indoor unit of the heating and cooling apparatus (generally, referred as an air conditioner) among conventional air conditioners. As shown in FIG. 1, an suction grille member(5) is provided at the lower front surface of an indoor unit main body (hereinafter referred to as a main body) with a plurality of suction inlets(3) to suck room air and with a plurality of discharge outlets(7) at the upper front surface of the main body to discharge the heat-exchanged air, i.e., the heated or cooled air, that is sucked through the suction inlets(3).

Furthermore, the discharge outlets(7) comprises vertical vanes(9) and horizontal vanes(11) for controlling the vertical and horizontal directions of the air discharged indoors therethrough, a covering member(13) attached for forming an external appearance thereof and for protecting the interior parts therein, and a controlling part(15) disposed at the lower portion of the cover member(13) for controlling overall operational modes (automatic, cooling, dehumidifying, blowing, heating, etc.) of the air conditioner, a start or stop operation thereof and the amount and direction of the air discharged through the discharge outlets(7).

As shown in FIG. 2, there are a filtering member(17) disposed at the inner side of the suction grille member(5) for filtering dust and foreign objects floating with the room air sucked through the suction inlets(3) and a heat-exchanger (19) behind the filtering member(17) for heat-exchanging into heated air or cooled air through evaporative latent heat of a coolant.

In addition, the heat-exchanger(19) is disposed thereon with a blower fan(23) (hereinafter referred as indoor fan) which rotates according to operation of an indoor fan motor in order to suck the room air through the suction inlets(3) and, at the same time, to discharge through the discharge outlets(7) the air heat-exchanged at the heat-exchanger(19). The indoor fan(23) is also provided with a duct member(25) outside thereof for covering the indoor fan(23) and for guiding the stream of the air sucked through the suction inlets(3) and discharged through the discharge outlets(7).

Figure 3:
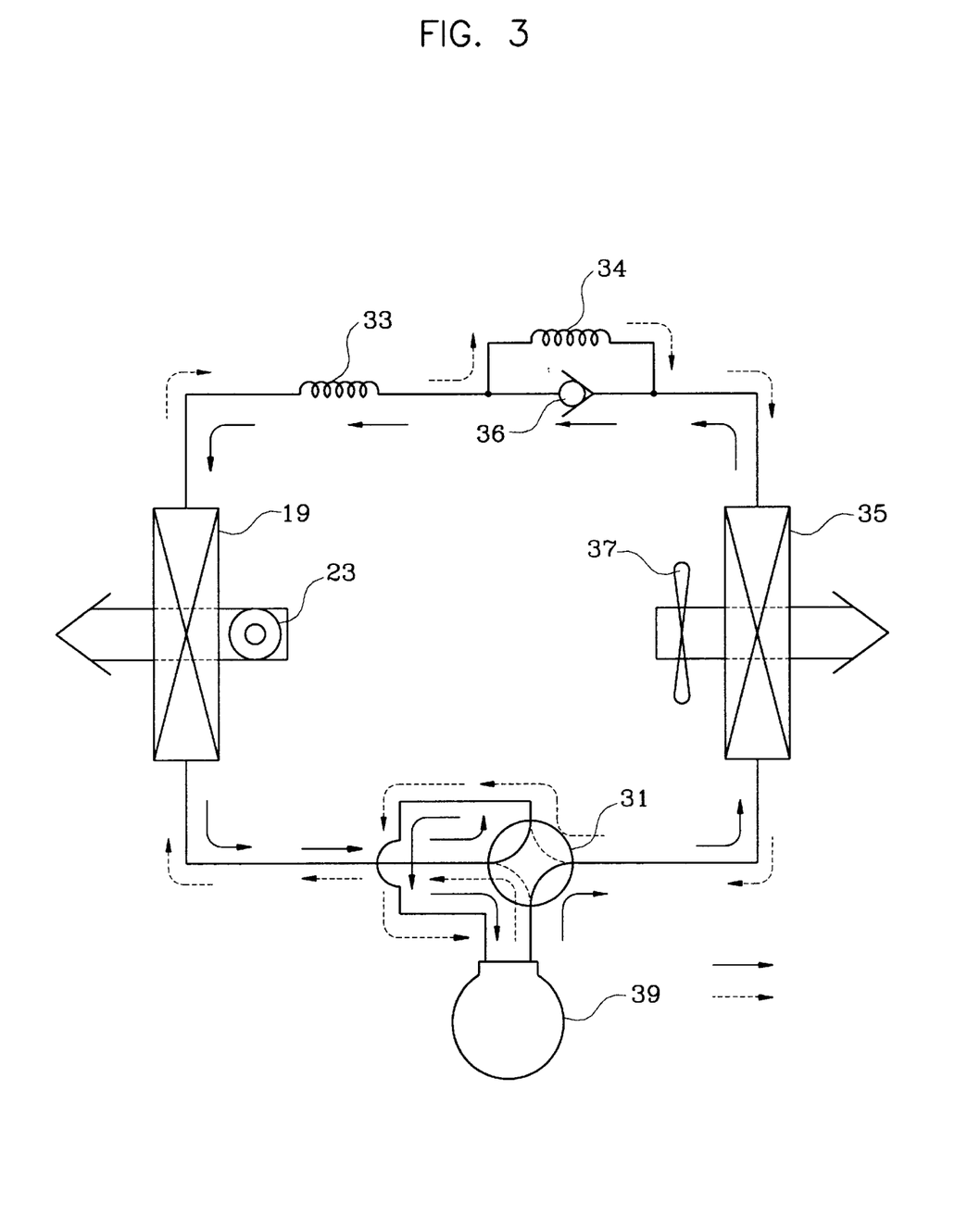
FIG. 3 is a flowchart for illustrating a circulation route of a conventional air conditioner.

In an inverter air conditioner with a dual function of heating and cooling operations, the coolant is circulated in the following sequence: compressor(39)—four way valve (31)—indoor heat-exchanger(19)—expansion valve(33)—heating expansion valve(34)—outdoor heat-exchanger(35)—four way valve(31)—compressor(39), as shown in a dotted line in FIG. 3 when the four way valve(321) is turned on for the heating operation.

On the other hand, when the four way valve(3 1) is turned off for the cooling operation, the coolant is circulated in the following sequence: compressor(39)—four way valve(31)—outdoor heat-exchanger(35)—one way valve(36)—expansion valve(33)—indoor heat-exchanger(19)—four way valve(31)—compressor(39) as shown in a straight line in FIG. 3. At this time, the four way valve(31) controls the circulation route of the coolant in the straight line or in the dotted line respectively when the four way valve(31) is turned off or on.

In the inverter air conditioner with a dual function of cooling and heating operations, an user turns on a start/stop key (hereinafter referred to as an operation key) with a remotely controlled unit or with the operating part(15) and selects a desired operation mode (for instance, heating). When the set temperature (Ts) is higher than the room temperature (Tr), an operation frequency of the compressor (39) is determined by the temperature difference between Ts and Tr to drive the compressor(39).

When the compressor(39) is driven, the coolant is circulated in the following sequence, as shown in the dotted line in FIG. 3: compressor(39)—four way valve(31)—indoor heat-exchanger(19)—expansion valve(33)—heating expansion valve(34)—outdoor heat-exchanger(35)—four way valve(31)—compressor (39), to thereby heat the indoor heat-exchanger(19). Operation of the indoor fan(23) is controlled according to the temperature of the indoor heat-exchanger(19).

If the temperature of the indoor heat-exchanger(19) is lower than the predetermined temperature (about 27° C.), the indoor fan(23) is stopped to prevent cool air from being discharged indoors at the initial heating stage. If the temperature of the indoor heat-exchanger(19) is higher than the predetermined temperature (about 27° C.), the indoor fan (23) is operated.

If the indoor fan(23) is operated, the dust and foreign objects floating in the room air are sucked through the suction inlets(3) into the main body(l) to be removed by the filtering member(17). The purified room air is heat-exchanged into warn air by way of evaporative latent heat of the coolant at the indoor heat-exchanger(19).

The warm air heat-exchanged at the indoor heat exchanger(19) is guided upwards and discharged indoors through the discharge outlets(7). The warm air discharged through the discharge outlets(7) carries out the heating operation at air directions according to the angles of the vertical vanes(9) and the horizontal vanes(11).

When the temperature of the indoor heat-exchanger(19) lowers under the predetermined temperature by the room temperature(Tr), the indoor fan(23) is to be turned off. If this phenomenon is repeated, the heating operation can not be properly carried out. While the compressor(39) is in operation, the warm coolant tends to be continuously supplied into the indoor heat-exchanger(19). Even though the temperature of the indoor heat-exchanger(19) lowers under the predetermined temperature (about 24° C.), the compressor(39) can be in continuous operation carrying out the heating operation without turning off the indoor fan(23).

There is a problem in the conventional heating control apparatus in that cool air can be continuously discharged without properly responding to the change of the room temperature when the compressor(39) is in continuous operation driving the indoor fan(23) even if the temperature of the indoor heat-exchanger(19) lowers under the predetermined temperature (about 24° C.).

SUMMARY OF THE INVENTION

The present invention is presented to solve the aforementioned problem and it is an object of the present invention to provide a heating control apparatus of an air conditioner and method thereof to prevent cool air from being discharged by turning off an indoor fan when a compressor is in operation and the temperature of the indoor heat-exchanger lowers under the predetermined temperature (about 24° C.) and when the temperature of the indoor heat-exchanger does not reach the predetermined temperature (about 24° C.) within the predetermined time duration.

In order to achieve the object of the present invention, there is provided a heating control apparatus of an air conditioner having an indoor heat-exchanger to heat-exchange the room air circulated by an indoor fan and a compressor to circulate a coolant which is to be heat-exchanged at the heat-exchanger, the apparatus comprising:

temperature detecting means to detect changing temperature of the indoor heat-exchanger during the heating operation via the operation of the compressor;

controlling means to control the indoor fan by counting the time according to the temperature of the indoor heat-exchanger detected by the temperature detecting means; and indoor fan motor driving means to turn the indoor fan off according to the control of the controlling means in order to prevent cool air from being discharged when the temperature of the indoor heat-exchanger detected by the temperature detecting means is under the predetermined temperature for the predetermined time duration.

The method of the heating control apparatus of the air conditioner in accordance with the present invention comprises the steps of:

a heating step for carrying out the heating operation by discharging warm air out of the indoor heat-exchanger;

a temperature detecting step for detecting the temperature of the indoor heat-exchanger;

a time discrimination step for discriminating the time counted by the controlling means, when the temperature of the indoor heat-exchanger detected at the temperature detecting step is over the predetermined temperature, is over the predetermined time; and an indoor fan turning off step for turning off an indoor fan according to the controlling means to prevent cool air from being discharged as the predetermined time is over at the time discriminating step.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

The present invention is described in detail with reference to the accompanying drawings. Throughout the drawings, like reference numerals and symbols are used for designation of like or equivalent parts or portions for simplicity of illustration and explanation, and redundant references will be omitted.

Figure 4:
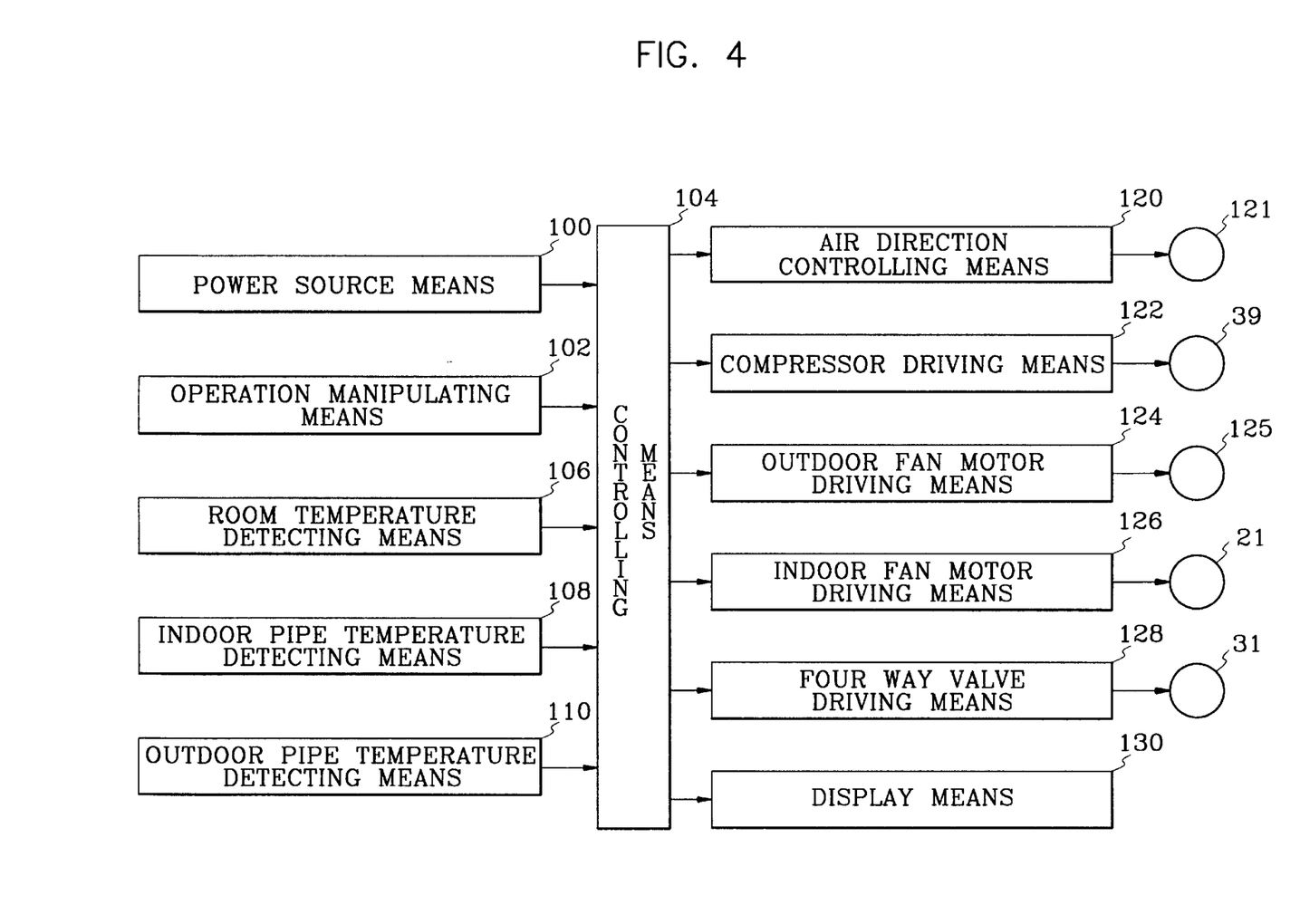
FIG. 4 is a schematic block diagram for illustrating a heating control apparatus in accordance with an embodiment of the present invention.

As shown in FIG. 4, power source means(100) is provided to transform commercial alternating current voltage supplied from the alternating current power terminal(101) into the predetermined direct current voltage. Operation manipulating means(102) comprises a plurality of selection keys for all operation modes (auto, cooling dehumidifying, blowing, heating and the like), for an amount (strong air, weak air, or soft air) of air discharged through the discharge outlets(7), for temperature (Ts) to be set as desired, and an operation key to start or stop the air conditioner.

Besides, controlling means(104) is a microcomputer to initialize the operation of the air conditioner by receiving the direct current voltage supplied from the power source means (100) and to control overall operations of the air conditioner according to the operation selection signals from the operation manipulating means(102), wherein the controlling means(104) controls the operation of the indoor fan(23) by counting the time according to the temperature of the indoor heat-exchanger pipe while the compressor is in operation.

Room temperature detecting means(106) detects the temperature (Tr) of the room air sucked through the suction inlets(3) to adjust the room temperature to the temperature (Ts) an user sets with the operation manipulating means (102) by carrying out the heating operation of the air conditioner. Indoor humidity detecting means(108) detects the humidity (Hr) of the room air sucked through the suction inlets. Indoor pipe temperature detecting means(110) detects the temperature of the indoor heat-exchanger pipe which changes during the heating operation of the air conditioner, that is, the temperature of the coolant passing at the indoor heat-exchanger(19).

Air direction controlling means(120) controls an air direction motor(121) to get the air discharged through the discharged outlets(7) into the predetermined horizontal and vertical directions evenly all over the room while compressor driving means(122) controls operation of a compressor (39) by way of the control signal generated from the controlling means(104) according to a temperature difference between the temperature (Ts) the user preset with an operation manipulating means(102) and the temperature (Tr) detected by the indoor temperature detecting means(106).

Outdoor fan motor driving means(124) controls an outdoor fan(125) by controlling the rotation number thereof to blow outdoors the air heat-exchanged at the outdoor heat-exchanger(35) by way of the control signal generated from the control means(104) according to the temperature difference between the temperature (Ts) preset by the user and the temperature (Tr) detected by the indoor temperature detecting means(106).

Indoor fan motor driving means(125) controls the indoor fan(23) by controlling the rotation number thereof according to the user's set air amount with the operation manipulating means(20) to blow indoors the air heat-exchanged at the heat-exchanger(19) by way of the control signal generated from the control means(104).

As shown in the drawings, four way valve driving means (128) controls an on/off operation of the four way valve(31) to change the flow of the coolant according to the operation condition (cooling or heating) input by the operation manipulating means(102) by way of the control signal generated from the control means(104). Display means(130) displays the operation mode (auto, cooling, dehumidifying, blowing, heating and the like) selected by the operation manipulating means(102), and a dehumidifying lamp indicates the dehumidifying operation or dehumidifying completion and overall operation state of the air conditioner.

Figure 5A:
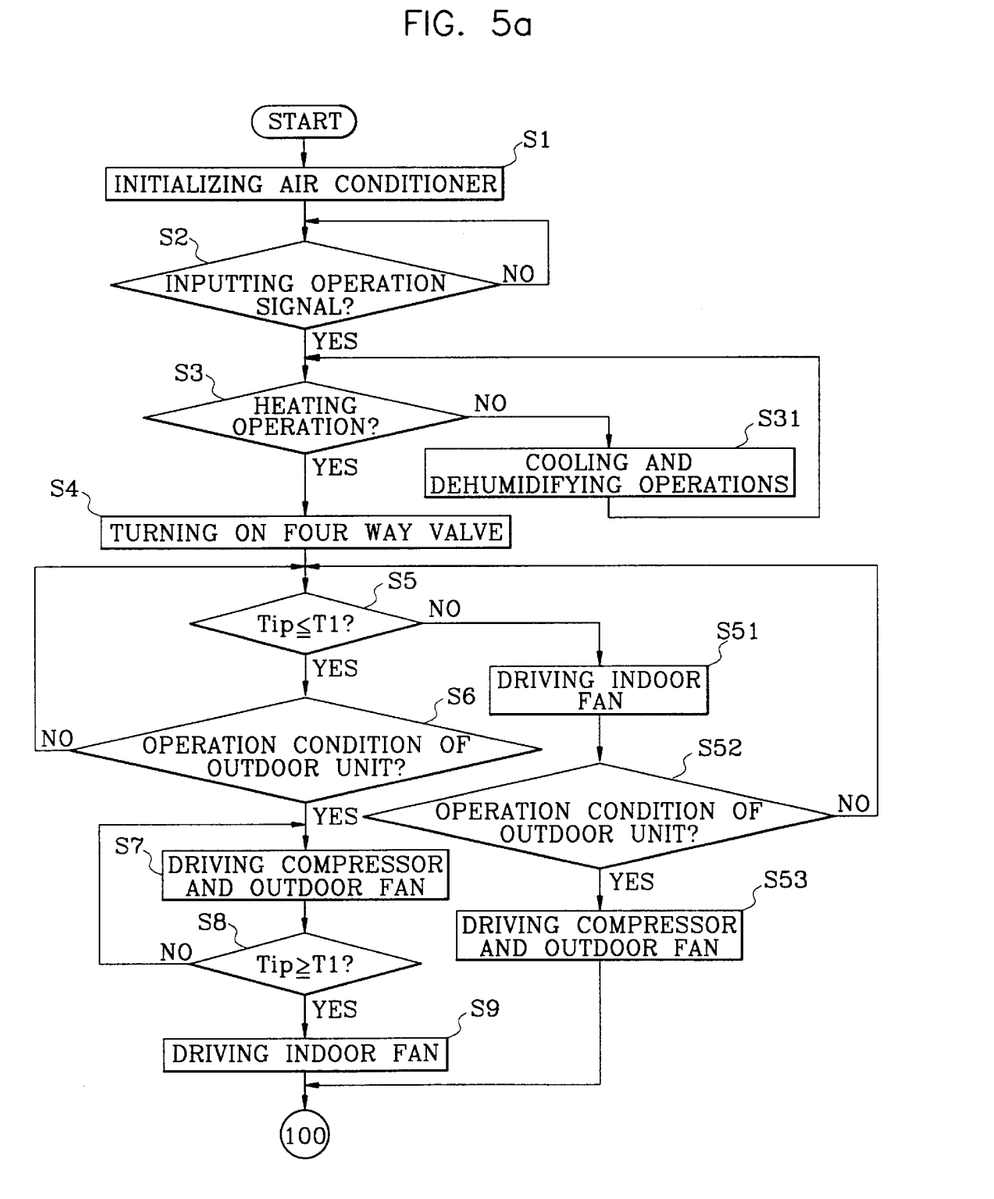
FIGS. 5a and 5b are flowcharts for illustrating heating control operation of the air conditioner in accordance with the present invention.
Figure 5B:
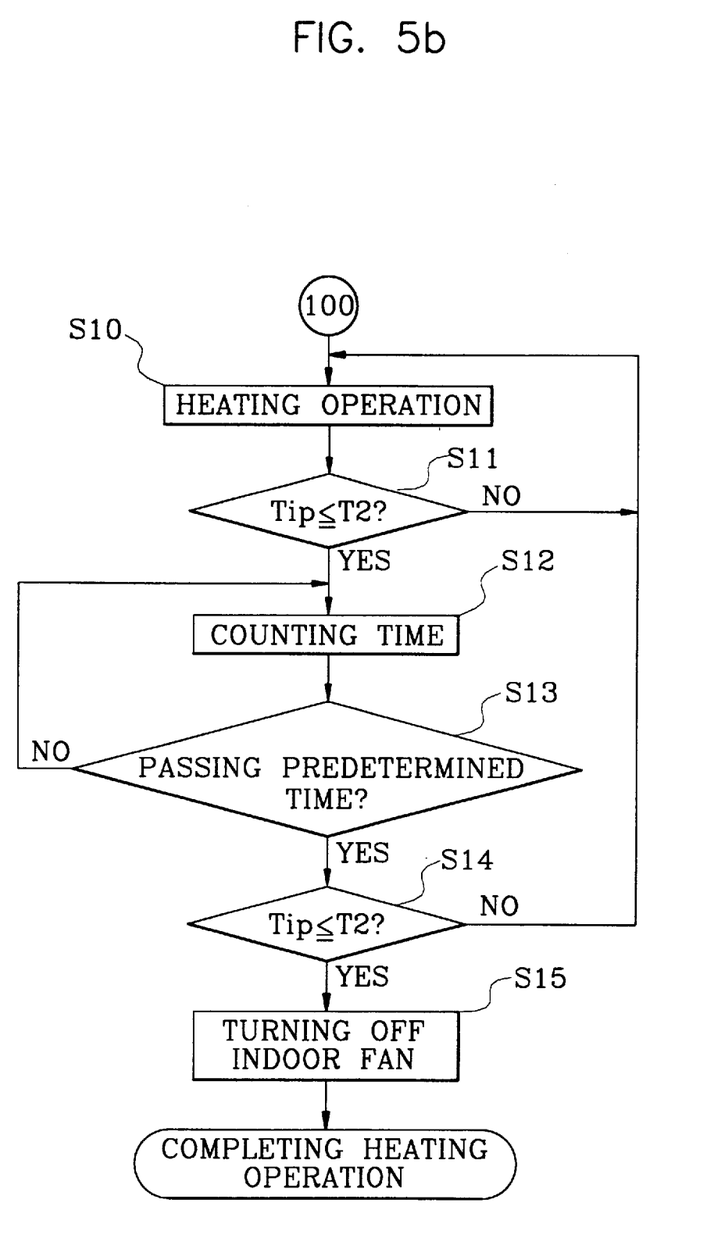

Hereinafter, a heating control apparatus and the effect of its method are described. FIGS. 5a and 5b are flow charts for illustrating operational sequence of the heating control apparatus of an air conditioner in accordance with the present invention, wherein reference symbol S refers to method steps.

First of all, when a power is applied to the air conditioner, the power source means(100) serves to convert the commercial alternating current voltage supplied from the alternating current power terminal into a predetermined direct current voltage necessary for driving the air conditioner and thereafter outputs same to respective driving circuit and controlling means(104).

At step S1, the direct current voltage output from the power source means(100) is received by the controlling means(104) to initialize the operation of the air conditioner. At this time, an user pushes an operation key with the operation manipulating means(102) to select an operation mode (for instance, heating) of the air conditioner, to set a temperature(Ts) as desired and to set an air amount, whereby an operation start signal and other operation selection signals (hereinafter referred as operation signal) are sent to the controlling means(104).

At step S2, the controlling means(104) discriminates whether the operation key is input from the operation manipulating means(102). If no operation signal is input to the controlling means(104), repeated operations subsequent to step S2 are performed with the air conditioner being maintained at an operation stand-by state.

As a result of the discrimination at step S2, if the operation signal is input (in case of YES), flow advances to step S3, where the controlling means (104) to check whether the operation condition input by the operation manipulating means(102) is the heating operation. If no operation signal is input to the controlling means(104), flow proceeds to step S31 for carrying out cooling or dehumidifying operation and repeated operations subsequent to S3 are performed.

As a result of the discrimination at step S3, if the operation is heating operation (in case of YES), flow proceeds to step S4, where the controlling means(104) sends a control signal for controlling the four direction valve(31) to the four direction valve driving means(128). Therefore, the four direction valve driving means(128) turns on the four direction valve(31) according to the control of the control means(104), whereby the coolant circulates in the following direction: compressor(39)—four way valve(31)—indoor heat-exchanger(19)—expansion valve(33)—heating expansion valve(34)—outdoor heat-exchanger(35)—four way valve(31)—compressor(39).

At step S5, the indoor pipe temperature detecting means (108) detects the temperature (Tip) of the indoor heat-exchanger(19). At that time, the controlling means(104) takes over analog data of the indoor pipe temperature (Tip) detected by the indoor pipe temperature means(108) to transform digital information, to thereby discriminate whether the indoor pipe temperature is under the predetermined temperature (T1: about 27° C.: a preheating pipe temperature to prevent cool air from being discharged at the initial stage of the heating operation).

As a result of the discrimination at step S5, if the indoor pipe temperature (Tip) is under the predetermined temperature (T1) (in case of YES), the cool air can be discharged indoors. Therefore, the outdoor unit is firstly driven to heat the indoor heat-exchanger(19) without actuating the indoor fan(23). Then, flow advances to step S6, where the controlling means(104) discriminates whether the outdoor unit is at an operation condition. The operation condition of the outdoor unit means a case that the room temperature (Tr) detected by the room temperature detecting means(106) is lower than the temperature (Ts) set by the user.

As a result of the discrimination at step 6, if the outdoor unit is not at the operation condition, repeated operations subsequent to step S5 are performed. If the outdoor unit is at the operation condition (in case of YES), flow proceeds to step S7, where the controlling means(104) determines the operation frequency of the compressor(39) and the rotation number of the outdoor fan motor(125) according to the temperature difference of the room temperature (Tr) and the set temperature (Ts), and outputs control signals to drive the compressor(39) and the outdoor fan(37) respectively to the compressor diving means(122) and to the outdoor fan motor driving means(124).

Accordingly, the compressor driving means(122) drives the compressor(39) according to the operation frequency determined by the controlling means(104), and the outdoor fan motor driving means(124) drives the outdoor fan(37) according to the rotation number determined by the controlling means(104).

At step 8, the indoor pipe temperature detecting means (108) detects the temperature of the indoor heat-exchanger (19) heated during the circulation of the coolant by way of the operation of the compressor(39) and the controlling means(104) discriminates whether the indoor pipe temperature (Tip) detected by the indoor pipe detecting means(108) is over the predetermined temperature (T1). If the indoor pipe temperature (Tip) is not over the predetermined temperature (in case of NO), the cool air can be discharged indoors. Therefore, flow returns to S7 and repeated operations subsequent to 7 are performed.

As a result of the discrimination at step S8, if the indoor pipe temperature (Tip) is over the predetermined temperature(T1) (in case of YES), cool air is not discharged indoors. Therefore, flow proceeds to step S9, where the controlling means(104) outputs a control signal to the indoor fan motor driving means(126) to drive the indoor fan(23). Therefore, the indoor fan motor driving means(126) drives the indoor fan(23) by controlling the rotation number of the indoor fan motor(21) according to the preset air amount.

As a result of the discrimination at step S5, if the indoor pipe temperature (Tip) is not under the predetermined temperature (in case of NO), cool air is not discharged indoors. Therefore, flow proceeds to step S51, where the controlling means(104) outputs a control signal to drive the indoor fan(23) to the indoor fan motor driving means(126). Therefore, the indoor fan motor driving means(126) drives the indoor fan(23) by controlling the rotation number of the indoor fan motor(21) according to the preset air amount. At step S52, the controlling means(104) discriminates whether the outdoor unit is at an operation condition.

As a result of the discrimination at step S52, if the outdoor is not at the operation condition (in case if NO), flow returns to step S5 and repeated operations subsequent to step S5 are performed. If the outdoor unit is at the operation condition (in case of YES), flow proceeds to step S53, where the controlling means(104) determines an operation frequency of the compressor(39) and a rotation number of the outdoor fan motor(125) according to the temperature difference between the room temperature (Tr) and the set temperature (Ts), to thereby output control signals to the compressor driving means(22) and to the outdoor fan motor driving means(124) to respectively drive the compressor(39) and the outdoor fan(37).

Accordingly, the compressor driving means(122) drives the compressor(39) according to the operation frequency determined by the control means(104) and the outdoor fan motor driving means(124) drives the outdoor fan(37) according to the rotation number determined by the controlling means(104). Then, flow proceeds to step S1.

After the indoor fan(23), outdoor fan(37), and compressor (39) are operative at step S10, the coolant compressed into a gas of high temperature and high pressure by the compressor(39) is infused into the indoor heat-exchanger (19) through the four way valve(31), and the indoor heat-exchanger(19) heat-exchanges and cools the compressed gaseous coolant of high temperature and high pressure into the warm air to be blown by the indoor fan(23), whereby the room air sucked through the suction inlets(3) is heat-exchanged into warm air while passing through the indoor heat-exchanger(19).

The warm air heat-exchanged at the indoor heat-exchanger(19) moves upwards to heat the room, controlling the air directions according to the angles of the vertical and horizontal vanes swingably coupled at the discharge outlets (7). At that time, the liquid coolant of low temperature and low pressure passes through an expansion valve(33) and heating expansion valve(34) to get expanded to the evaporative pressure thereof, whereby the pressure of the coolant is then reduced to the gaseous coolant of low temperature and low pressure to be infused into the outdoor heat-exchanger(35).

Accordingly, the outdoor heat-exchanger(35) receives the gaseous coolant of the low temperature and low pressure and heat-exchanges it with the air blown by the outdoor fan(37) via the evaporative latent heat of the coolant for cooling. The gaseous coolant of low temperature and low pressure cooled at the outdoor heat-exchanger(35) is again sucked through the four way valve(31) into the compressor(39) to be circulated in the repetitive heating cycle as shown in the dotted line in FIG. 3.

During the heating operation, the cool air in the room is infused into the indoor heat-exchanger(19), so that the temperature of the indoor heat-exchanger(19) is lowered. At step S11, the indoor pipe temperature detecting means(108) detects the temperature (Tip) lowered at the indoor heat-exchanger(19), and the temperature (Tip) detected by the indoor pipe temperature detecting means(108) is compared with the predetermined temperature (T2). If the indoor pipe temperature (Tip) is not under the predetermined temperature (in case of NO), flow returns to step S10 for the continuous heating operation and repeats operations subsequent to step S10.

As a result of the discrimination at step S11, if the indoor pipe temperature(Tip) is under the predetermined temperature (T2) (in case of YES), flow proceeds to step S12, where the controlling means(104) counts the time duration when the temperature of the indoor heat-exchanger(19) is under the predetermined temperature (T2). At step S13, the controlling means(104) discriminates whether the time duration counted by the controlling means(104) is over the predetermined time. If the time duration is not over the predetermined time (in case of NO), flow returns to step S12 where the time duration is continuously counted by the controlling means(104) until it passes the predetermined time, and repeated operations subsequent to step S12 are performed.

As a result of the discrimination at step S13, if the time duration is over the predetermined time (in case of YES), flow proceeds to step S14, where the indoor pipe temperature detecting means(108) detects the temperature of the indoor heat-exchanger(19), which changes continuously as the coolant of high temperature is infused by the indoor heat-exchanger(19) while the compressor(39) is in operation. At the same time, it is discriminated whether the temperature detected by the indoor pipe temperature detecting means(108) is under the predetermined temperature (T2). If the temperature detected by the indoor pipe temperature detecting means(108) is not under the predetermined temperature (T2) (in case of NO), flow returns to step S10 and repeated operations subsequent to step S10 are performed.

As a result of the discrimination at step S14, if the indoor pipe temperature(Tip) is under the predetermined temperature(T2) (in case of YES), flow proceeds to step S15 to prevent cool air from being discharged indoors. At that time, the controlling means(104) sends a control signal to the indoor fan motor driving means(126) to stop the indoor fan(23).

The indoor fan motor driving means(126) turns off the indoor fan(23) according to the control signal sent by the controlling means(104) to prevent cool air from being discharged indoors and to stop the operation of the air conditioner.

As described above, the heating control apparatus of an air conditioner and method thereof in accordance with the present invention, there is an effect in that the time when the temperature of the indoor heat-exchanger is under the predetermined temperature (24° C.) with the compressor being maintained at the operation state is counted, so that cool air is prevented from being discharged indoors by turning off the indoor fan until the temperature of the indoor heat-exchanger reach the predetermined temperature.

What is claimed is:

1. A heating control apparatus of an air conditioner which includes an indoor heat-exchanger to heat-exchange room air circulated by an indoor fan and a compressor to circulate a coolant which is to be heat-exchanged at the heat-exchanger, the apparatus comprising:

a temperature detecting unit to detect the changing temperature of the indoor heat-exchanger during a heating operation performed during operation of the compressor;

a controlling unit to control the operation of the indoor fan by counting the time according to the temperature of the indoor heat-exchanger detected by the temperature detecting unit; and an indoor fan motor driving unit to turn the indoor fan off according to the control of the controlling unit in order to prevent cool air from being discharged when the temperature of the indoor heat-exchanger detected by the temperature detecting unit is under predetermined temperature for a predetermined time duration.

2. The heating control apparatus of the air conditioner, as defined in claim 1, wherein the apparatus turns off the indoor fan if the temperature of the indoor heat-exchanger does not reach the predetermined temperature (24° C.) within the predetermined time duration by counting the time when the temperature of the heat-exchanger is under the predetermined temperature (24° C.) with the compressor being maintained at the operation state.

3. A heating control method of an air conditioner, the method comprising the steps of:

A) carrying out a heating operation by driving an indoor fan for discharging warm air out of an indoor heat-exchanger;

B) detecting the temperature of the indoor heat-exchanger;

C) comparing the detected temperature with a predetermined temperature;

D) counting time beginning when the detected temperature falls below the predetermined temperature; and E) turning off the indoor fan when the counted time reaches a predetermined time and the detected temperature is still below the predetermined temperature, to prevent cool air from being discharged.

* * * * *